March 5, 1929. W. SCHOTT 1,704,021
ELECTRIC CIRCULATING HEATER
Filed March 21, 1928

W. Schott
INVENTOR

By Marks & Clark
Attys.

Patented Mar. 5, 1929.

1,704,021

UNITED STATES PATENT OFFICE.

WILLIAM SCHOTT, OF HANOVER, GERMANY.

ELECTRIC CIRCULATING HEATER.

Application filed March 21, 1928, Serial No. 263,533, and in Germany March 23, 1927.

In liquid heaters that do not operate on the electrode principle but by resistance heating, the resistance elements that are heated by electric current are generally in direct contact with the liquid to be heated. The resistance elements are very heavily attacked by the hydrogen which is continuously generated and is thereby rapidly destroyed. Furthermore, there are always certain difficulties in extending to the outside the inlet and discharge pipes for the electric current and maintaining them water-tight.

Liquid heaters are known in which resistance elements heat tubular members or the like that in turn either surround the liquid to be heated or are traversed by it. In such apparatus, however, it is necessary to have a plurality of packings, which under the considerable thermal pressures that arise, it is difficult to maintain permanently water-tight, moreover the heated liquid loses to the atmosphere a considerable part of its heat, and to prevent this special insulating casings and like means must be employed. The construction of such devices is furthermore generally so complicated that they are not suitable for small liquid heaters. Moreover with most liquid heaters if the heating elements are damaged it is very difficult to disconnect and mend them.

These disadvantages are avoided by the use of the apparatus according to the invention.

According to the invention the liquid is guided by simple structural means in such manner that the liquid which comes into contact with the outer casing of the circulating heater does not exceed the normal temperature of the atmosphere, so that it is practically impossible for the heat to be dissipated and consequently for any loss to occur in heat energy. The particular construction and arrangement of the heating body enables the heating elements to be easily mended if they are damaged and operates in a simple manner a cut-out device for the electric current.

Figure 1:
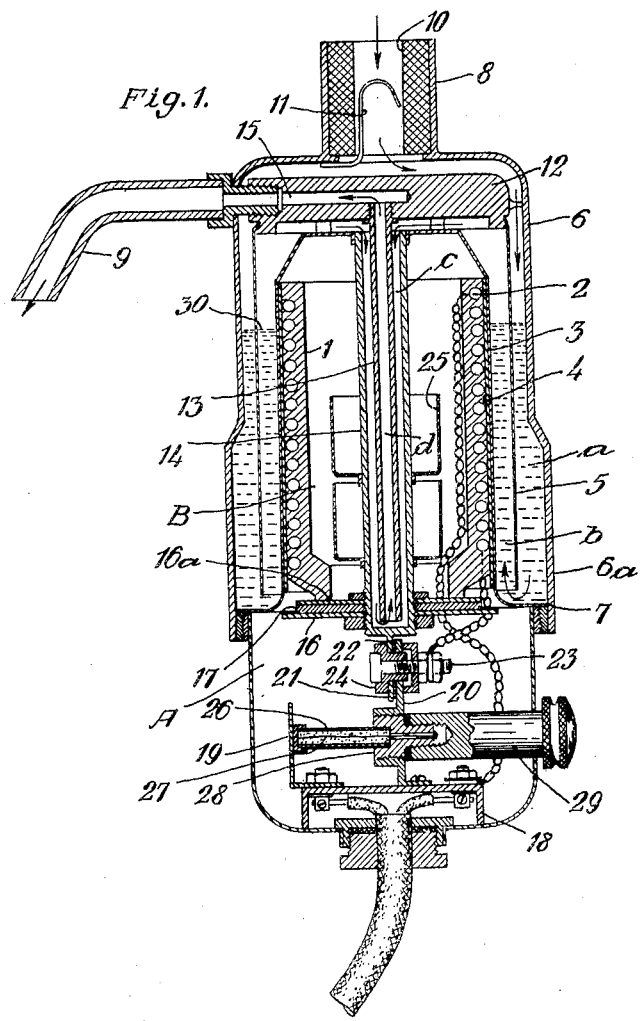
Figure 2:
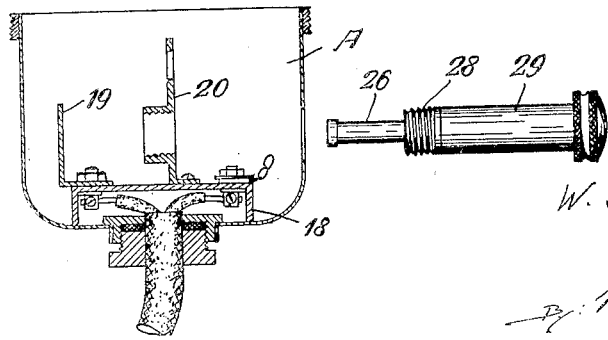

A suspended circulating heater according to the invention is illustrated by way of example in the accompanying drawings, in which Figure 1 is a longitudinal section of a circulating heater according to the invention, and Figure 2 is a longitudinal section through the lower part of the circulating heater after the removal of a part of the apparatus.

According to the invention a tubular heating body 1, which, for example, is provided with coils of heating tubing 2, is provided within a metal receptacle 3. An insulating medium, for example, in the form of a sheet of mica 4, is provided between the metal receptacle and the heating body. When the heating body is placed in the metal receptacle an insulating medium, for example, gypsum or cement, is applied upon the outer surface of the heating body, which upon drying slightly increases in volume, so that good transmission of heat from the heating body to the metal receptacle is assured. As will be seen from the drawing, the heating body advantageously does not extend quite to the inner end of the metal receptacle, in order to apply less heat to this part. In order to guide the water a body 5 enclosing the receptacle is provided at a distance both from the metal receptacle 3 and from an outer casing 6. The latter is advantageously provided with an extension 6ª. The metal receptacle 3 is fixed to the outer casing 6—for example, in the construction illustrated, where the outer casing is made of metal, by welding or soldering at the position 7. In the upper part of the circulating heater any suitable member 8 is provided for connection to a water supply, and the discharge tube 9 is likewise provided in the upper part of the circulating heater. A highly practical and simple method of attachment is shown in the drawing where the member 8 is provided with a rubber sleeve 10 which is advantageously conical internally and which allows the circulating heater to be fixed over an existing cock, and, notwithstanding, firmly holds the circulating heater. Earthing is effected by a resilient tongue 11 which is connected to the metal parts of the circulating heater.

In the upper part of the circulating heater a conductor body 12 is provided spaced off from the parts 3 and 6, between the metal receptacle and the water inlet; this body 12 controls the circulation of the liquid. The body 12 may be made of any suitable material, for example, porcelain, and it serves at the same time as support for the body 5 and a liquid guide, for example, a tube 13. This tube is disposed concentrically within a pipe 14. The pipe 14 is rigidly connected to the metal receptacle 3. Instead of this arrangement a U-shaped pipe may be employed. It is important that within the metal receptacle 3 liquid guides having a small content of water are provided, the water in it evaporating soon after the inflow of water to the circulating heater is closed, whereby the temperature in these parts rapidly rises. In the conductor body 12 a pipe 15 is provided attached to the tube 13, the pipe 15 being in communication with the discharge pipe 9.

According to the invention, moreover, below the metal receptacle 3 within the casing of the circulating heater a large chamber A is provided which is insulated against the passage of heat to the chamber B within the metal receptacle.

For this purpose metal discs 16 and 16ª are provided with an intermediate layer 17 of an insulating medium such, for example, as asbestos. An electrical safety cut-out is provided in the chamber A and for this purpose the following apparatus is provided:

A contact member 19 and a metallic support 20 for any suitable safety cut-out are provided upon an insulating body 18. The support 20 is intended for conducting the heat from the important parts of the circulating heater to the cut-out, and thus secure interruption of the circuit. For connecting this support 20 to the parts referred to the support is according to the invention connected, heat-conductively, to the liquid conductor bodies provided within the metal receptacle ( in the example illustrated, the pipe 14), the plate 21 being applied, for example, to the pipe 14. This plate is tightly pressed to the support 20 by a clamping medium, for example, a pin 23, an electrical insulating layer 22 being interposed, a second insulation being produced by a bush 24. It is important that the parts of the circulating heater connected to the support 20 for the cut-out are so provided that their temperature rises rapidly for some time after the inflow of water has been stopped if a dangerous heating of the single parts should arise. For this purpose that part of the liquid guide is connected to the support 20 in which there will be no water left soon after it has been cut off and which consequently is cooled least or not at all. Furthermore the plate 16ª which recives the heat from the heating body 1 through a tube is connected, heat-conductively, to the part the purpose of which is to transmit the heat to the cut-out (in the example illustrated, pipe 14.)

By ribs or similar devices placed in position (in the example illustrated the heat interceptor 25) care is taken that the rise in heat in this part proceeds rapidly.

The electric cut-out consists in the example illustrated of a cartridge 26 with fuse wire 27 which is fixed by means of a metallic intermediate member 28 in a holder 29 made from an insulating material and by means of this is brought into electrical and heat-conductive connection with the support 20 in any known manner (in the example illustrated by a screw thread).

It will be understood that the invention is not limited to the device illustrated in the drawings but a device can be provided where the parts in which, upon the disconnection of the inflow of water, the generation of steam first takes place and in which accordingly there is a rapid rise in temperature, are connected directly to the water inlet.

The circulating heater operates as follows:
So long as the water is turned on it flows through the chambers a, b, c, d successively in the direction indicated by the arrows in order to flow through the pipe 15 and out of the discharge pipe 9 at the corresponding temperature. Immediately the discharge of water is arrested and it is forgotten at the same time to open the electrical connection the following takes place:

The water in the tubes 13 and 14 rapidly rises, by reason of the comparatively small quantity of water, to the temperature of evaporation and is discharged through the discharge pipe 9 in the form of steam. The water in the chambers a and b is brought gradually to boiling point and there is a heavy discharge of steam through the discharge pipe 9 whereby the operator has his attention called to the need for breaking the electric connection. The water in the outer chambers a and b gradually falls, for example, until it reaches the level 30, while, in this condition, the chambers c and d have only steam left in them. By reason of the extension 6ª of the casing 6 a comparatively large water chamber is here provided the reduction of which by the flowing away of the steam only proceeds gradually and thereby the metal receptacle and the heating body are always correspondingly cooled by the large surface in contact with water, while the temperature of the pipe 14 rapidly rises. Before the supply of water in the chambers a and b is appreciably used up, the temperature of the pipe 14 and consequently of the plate 21 has reached such a stage that the safety cut-out comes into operation. As the heating body does not extend to the upper end of the metal receptacle by far the greater part of the heating body or of the metal receptacle in heat-conductive communication therewith always remains after the evaporation of the water in the upper part of the circulating heater, in contact with the water, the latter maintaining it at a low temperature.

I claim:—
1. An electric circulating heater, consisting, in combination, of a pot-shaped metal tube, an electric resistance within this pot-shaped tube, an outer casing surrounding the pot-shaped metal tube and forming a water chamber with the latter, a guide-body connected to the pot-shaped metal tube and containing passages for the inflow and egress of the water, a tube, closed at the lower extrem- ity, within the electric resistance, a discharge tube for the water within the tube just referred to, both tubes having a comparatively small internal cross-section, and an electric heat conducting thermal switch connected to the first-mentioned tube and cutting out the electric current when the temperature of the said tube rises substantially.

2. An electric circulating heater, consisting, in combination, of a pot-shaped metal tube, an electric resistance within this pot-shaped tube, an outer casing surrounding the pot-shaped metal tube and forming a water chamber with the latter, a guide-body connected to the pot-shaped metal tube and containing passages for the inflow and egress of the water, a tube, closed at the lower extremity, within the electric resistance, a discharge tube for the water within the tube just referred to, both tubes having a comparatively small internal cross-section, an electric heat conducting thermal switch connected to the first mentioned tube and cutting out the electric current when the temperature of the said tube rises substantially, heat conducting metal plates connected to the first-mentioned tube that is closed at the lower extremity, an insulating layer between the metal plates, the metal plates with the insulating layer separating the space for the thermal switch from the interior of the pot-shaped tube.

3. An electric circulating heater, consisting, in combination, of a pot-shaped metal tube, an electric resistance within this pot-shaped tube, an outer casing surrounding the pot-shaped metal tube and forming a water chamber with the latter, a guide-body connected to the pot-shaped metal tube and containing passages for the inflow and egress of the water, a tube, closed at the lower extremity, within the electric resistance, heat conducting heat intercepters connected to this tube, a discharge tube for the water within the said tube, both tubes having a comparatively small internal cross-section, an electric heat conducting thermal switch connected to the first mentioned tube and cutting out the electric current when the temperature of the said tube rises substantially, heat conducting metal plates connected to the first-mentioned tube that is closed at the lower extremity, an insulating layer between the metal plates, the metal plates with the insulating layer separating the space for the thermal switch from the interior of the pot-shaped tube.

4. An electric circulating heater, consisting, in combination, of a pot-shaped metal tube, an electric resistance within this pot-shaped tube, an outer casing extended downwardly and surrounding the pot-shaped metal tube and forming a water chamber with the latter, a partition wall within the said water chamber that does not extend to its bottom, a guide-body connected to the pot-shaped metal tube and containing passages for the inflow and egress of the water, a tube, closed at the lower extremity, within the electric resistance, heat-conducting heat intercepters connected to this tube, a discharge tube for the water within the said tube, both tubes having a comparatively small internal cross-section, a projection fitted to the bottom of the first-mentioned tube, a metal plate provided with a screw-thread for receiving an electric thermal switch with fuse wire, an electric insulating layer between the said projection and the said plate, these two parts being electrically insulated one from the other, but connected to conduct heat.

WILLIAM SCHOTT.